(12) United States Patent
Pardo et al.

(10) Patent No.: US 10,151,480 B2
(45) Date of Patent: Dec. 11, 2018

(54) REACTOR FOR HYDROTHERMAL CARBONIZATION WITH OPTIMIZED MIXTURE OF SLUDGE AND STEAM

(71) Applicant: SUEZ INTERNATIONAL, Paris la Defense (FR)

(72) Inventors: Pierre Emmanuel Pardo, Orsay (FR); Jean-Louis Bourdais, Chateaubriant (FR)

(73) Assignee: SUEZ INTERNATIONAL, Paris (FR)

( * ) Notice: Subject to any disclaimer, the term of this patent is extended or adjusted under 35 U.S.C. 154(b) by 24 days.

(21) Appl. No.: 15/324,270

(22) PCT Filed: Jun. 3, 2016

(86) PCT No.: PCT/EP2016/062698
§ 371 (c)(1),
(2) Date: Jan. 6, 2017

(87) PCT Pub. No.: WO2016/193460
PCT Pub. Date: Dec. 8, 2016

(65) Prior Publication Data
US 2017/0211808 A1    Jul. 27, 2017

(30) Foreign Application Priority Data

Jun. 5, 2015  (FR) ..................... 15 55142

(51) Int. Cl.
*F23G 7/00* (2006.01)
*F23G 5/02* (2006.01)
(Continued)

(52) U.S. Cl.
CPC .......... *F23G 7/001* (2013.01); *B01F 3/04503* (2013.01); *B01F 3/04602* (2013.01);
(Continued)

(58) Field of Classification Search
CPC ........ B01J 19/00; B01J 19/24; B01J 19/2415; B01J 2219/00049; B01J 2219/00051;
(Continued)

(56) References Cited

U.S. PATENT DOCUMENTS 9,512,376 B2 * 12/2016 Peus ..................... C10L 5/44
2015/0209692 A1   7/2015 Vyskocil
2016/0214880 A1   7/2016 Chauzy et al.

FOREIGN PATENT DOCUMENTS

FR    3 010 403 A1    3/2015
NZ    578521 A        5/2012
(Continued)

OTHER PUBLICATIONS

International Search Report, dated Aug. 2, 2016, from corresponding PCT application.
(Continued)

*Primary Examiner* — Natasha E Young
(74) *Attorney, Agent, or Firm* — Young & Thompson

(57) ABSTRACT

Disclosed is a reactor for treating, particularly by hydrothermal carbonization, sludge containing organic matter, including, with:
- a vessel (100) including an inner chamber arranged to receive the sludge and to form a path of travel for the sludge adapted to allow for circulation of the sludge,
- a sludge inlet (1) arranged to introduce the sludge into a sludge introduction area of the inner chamber,
- a sludge outlet (11) arranged to discharge at least part of the sludge contained in the inner chamber, and
- a steam inlet (3) arranged to inject steam in a steam injection zone of the inner chamber along a steam injection direction, the steam injection direction being different from a sludge circulation direction in the
(Continued)

Figure 1:
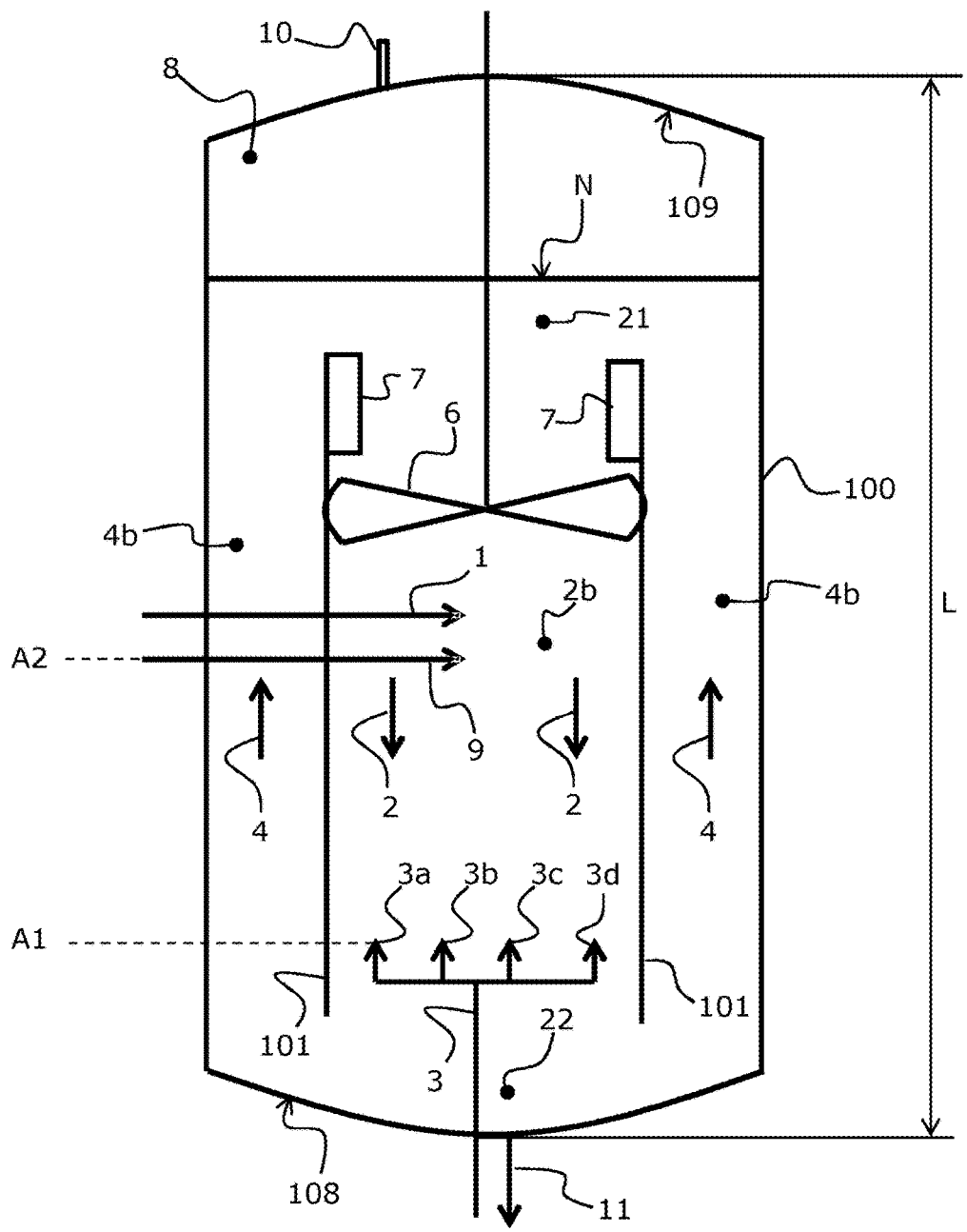

steam injection zone along the circulation path, the steam injection zone being separated from the sludge introduction zone.

19 Claims, 4 Drawing Sheets

(51) Int. Cl.
*B01J 19/00* (2006.01)
*B01J 19/24* (2006.01)
*B01F 3/04* (2006.01)
*C10L 9/08* (2006.01)
*C02F 1/38* (2006.01)
*C02F 11/10* (2006.01)
*F23G 5/027* (2006.01)
*C02F 3/22* (2006.01)

(52) U.S. Cl.
CPC ....... *B01F 3/04609* (2013.01); *B01J 19/2415* (2013.01); *C02F 1/38* (2013.01); *C02F 11/10* (2013.01); *C10L 9/086* (2013.01); *F23G 5/0276* (2013.01); *B01F 2003/04631* (2013.01); *B01F 2003/04673* (2013.01); *B01J 2219/00123* (2013.01); *B01J 2219/24* (2013.01); *C02F 3/22* (2013.01); *C02F 2301/04* (2013.01); *C02F 2303/06* (2013.01); *C10L 2290/141* (2013.01); *C10L 2290/148* (2013.01); *C10L 2290/54* (2013.01); *Y02W 10/15* (2015.05); *Y02W 10/40* (2015.05)

(58) Field of Classification Search
CPC .... B01J 2219/00121; B01J 2219/00123; B01J 2219/24; C02F 1/00; C02F 1/38; C02F 3/00; C02F 3/02; C02F 3/12; C02F 3/22; C02F 11/00; C02F 11/10; C02F 2301/04; C02F 2303/06; C10L 9/00; C10L 9/08; C10L 9/086; C10L 2290/14; C10L 2290/141; C10L 2290/148; C10L 2290/54; F23G 5/00; F23G 5/02; F23G 5/027; F23G 5/0276; F23G 7/00; F23G 7/001; Y02W 10/00; Y02W 10/10; Y02W 10/15; Y02W 10/40
See application file for complete search history.

(56) References Cited

FOREIGN PATENT DOCUMENTS

| WO | WO-2008081407 A2 * | 7/2008 | ................ C10L 5/44 |
|----|--------------------|--------|----------------------------|
| WO | 2010/092040 A1 | 8/2010 | |
| WO | 2014/027059 A1 | 2/2014 | |
| WO | 2014/135734 A2 | 9/2014 | |

OTHER PUBLICATIONS

Alexander Tremel et al., "Entrained flow gasification of biocoal from hydrothermal carbonization", Fuel, Apr. 23, 2012, pp. 396-403, vol. 102.

* cited by examiner

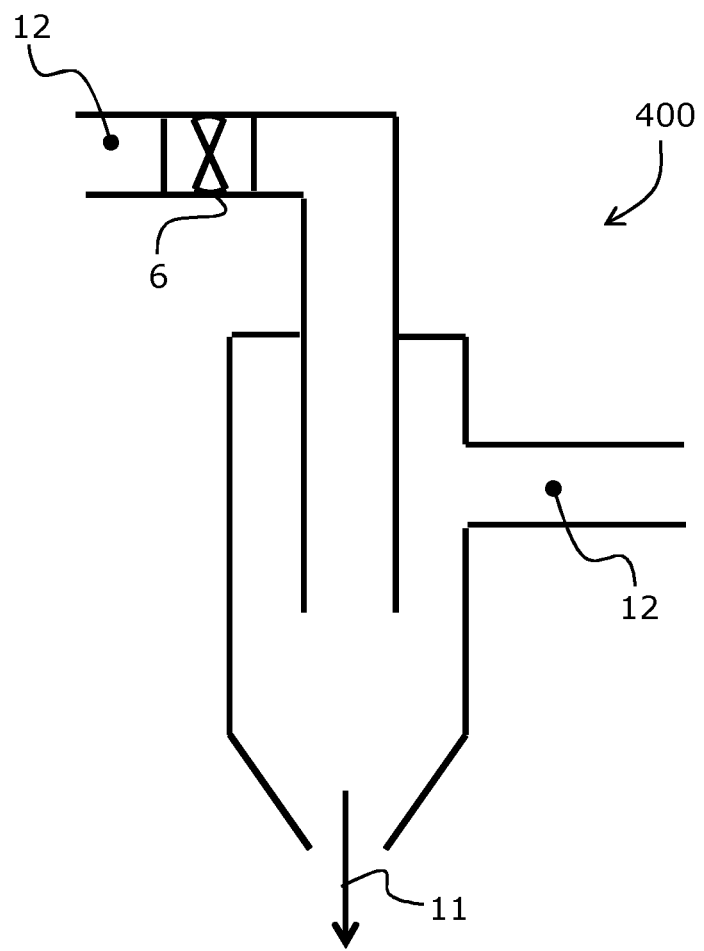

10,151,480 B2

REACTOR FOR HYDROTHERMAL CARBONIZATION WITH OPTIMIZED MIXTURE OF SLUDGE AND STEAM

This application is the U.S. national stage application of International Patent Application No. PCT/EP2016/062698, now WO 2016/193460, filed on Jun. 3, 2016, which claims priority of French Patent Application No. FR1555142, filed on Jun. 5, 2015, which is hereby expressly incorporated by reference in its entirety.

TECHNICAL FIELD

The present invention relates to a treatment reactor.

The scope of the invention is more particularly, although in a non limiting manner, that of the treatment of sludge containing an excessive amount of organic matter, coming from an urban or industrial wastewater treatment process, or network cleaning operations, for example. Treatment of this type aims to reduce the volume of sludge, stabilize it biologically and physico-chemically and to produce recoverable by-products.

The invention relates more particularly to the field of reactors for the continuous treatment of sludge containing organic matter, notably by hydrothermal carbonization.

STATE OF THE ART

The state of the art has developed two treatment families:
thermal hydrolysis,
hydrothermal carbonization.

The technique for the thermal hydrolysis of sludge was developed by Porteous in the early 20th century. This technique uses pressurized reactors operating in sequence. The sludge is pumped into a first reactor, into which the steam produced by a boiler is injected until a temperature of approximately 180° C. is obtained for a pressure of 1.5 MPa. The temperature is then maintained for 30 minutes, and then the sludge is discharged under its own pressure through a heat exchanger. This heat exchanger is used to recover heat from the sludge exiting the first reactor and to heat the sludge entering a second reactor. Numerous changes and improvements have been made since to improve productivity and ensure continuous operation. The hydrolysed sludge is then subjected to biological treatments, e.g. anaerobic digestion to reduce the quantity of sludge by producing biogas.

The hydrothermal carbonization (HTC) technique is similar to thermal hydrolysis but does not intend to prepare sludge for subsequent digestion. It aims to prepare sludge for processing into high-quality biocoal through the use of heat and at a pressure generally higher than in thermal hydrolysis, and over a longer period than for thermal hydrolysis (a few hours) and generally in the presence of a reagent.

The HTC technique can also produce biocoal, a product similar to humus, that can be used to improve the quality of agricultural soil and store $CO_2$. The hydrothermal carbonization process was described in 1913 by Friedrich Bergius, for which he was awarded the Nobel Prize for Chemistry in 1931.

These treatments are carried out in reactors, either in batch mode, simpler to perform, or—more recently—continuously.

Patent FR3010403 describes a process and a device for the thermal hydrolysis of sludge comprising a tubular thermal hydrolysis reactor having a first vertical portion directly extended by a second vertical portion. The inlet of the reactor is provided on the upper part of said first vertical portion. The outlet of said reactor is provided on the lower part of said second vertical portion, or vice versa. The inlet of the reactor is fed by at least one primary dynamic mixer-injector having a primary uniform mixture outlet. The sludge to be treated, containing the organic matter, is introduced into this primary dynamic mixer-injector which also comprises means for conveying live steam into a secondary dynamic mixer-injector.

European patent WO2014135734 describes a hydrolysis plant having two circulation sections connected in series to circulate the organic matter to be treated, and means for continuously supplying a first circulation section with organic matter, to transfer the organic matter from this first circulation section to a second circulation section and to extract the organic matter from the second circulation section. The steam and the organic matter, typically sludge, are injected at the same location, as in patent FR3010403.

Drawbacks of the Solutions of the Prior Art

The solutions of the prior art are not completely satisfactory as they involve a significant steam contribution during injection into the reactor. This results poor control of energy consumption and high operating cost, as well as a downgraded dryness.

The solutions of the prior art are adapted to treatments with intermediate pressure and temperature conditions, typically 0.6 MPa and 150° C., for relatively low retention times in the order of 30 minutes. They specifically relate to treatment by thermal hydrolysis, to prepare sludge for a subsequent anaerobic digestion step.

Furthermore, the sludge fed into a reactor may contain solid debris, including mineral aggregates that can clog the reactor inlet or damage the internal structures of the reactor. The solutions of the prior art do not allow for the reduction of these elements in the reactor.

Finally, the mixer-injectors required to homogenize the steam-sludge mixture are expensive and fragile.

The purpose of the present invention is to solve at least one of the above-mentioned problems or drawbacks.

DISCLOSURE OF THE INVENTION

To overcome these drawbacks, the invention proposes a reactor for treating sludge containing organic matter, particularly by hydrothermal carbonization, having:
 a vessel comprising an inner chamber arranged to receive the sludge and to form a path of travel for the sludge adapted to allow for circulation of the sludge,
 a sludge inlet arranged to introduce the sludge into a sludge introduction zone of the inner chamber,
 a sludge outlet arranged to discharge at least part of the sludge contained in the inner chamber, and
 a steam inlet arranged to inject steam into a steam injection zone of the inner chamber along a steam injection direction, the steam injection direction being different from a sludge circulation direction in the steam injection zone along the circulation path, the steam injection zone being separated from the sludge introduction zone.

Preferably, the inner chamber is of vertical dimension L (the vertical being defined by Earth's gravitation), the steam injection zone can be separated from the sludge introduction zone by a distance greater than $L/12$, preferably greater than $L/8$, more preferably greater than $L/4$. This distance is considered as the shortest distance between two points of the sludge inlet and the steam inlet, respectively.

The steam injection direction may be against (preferably opposite) the average direction of sludge circulation in the steam injection zone. Such an injection of steam against the flow of sludge optimizes the turbulence created by this injection.

The reactor can further comprise a circulator arranged to circulate the sludge in the inner chamber along the circulation path.

Preferably, the circulation path comprises at least a closed loop.

In this document, the terms "lower", "upper", "high", "low", "ascending", "descending", "above", "below", or "topped" refer to the vertical as defined by Earth's gravity.

The reactor may comprise, in an upper portion of the inner chamber, a degassing volume arranged to collect gaseous effluents contained in the sludge, the reactor may also comprise at least one vent arranged to discharge these gaseous effluents.

Preferably, the reactor can include at least one orifice arranged to inject acid into the vessel.

In an embodiment of the invention, the vessel comprises a wall arranged to separate two parts of the circulation path having opposite average sludge circulation directions.

In this embodiment, the wall can form a tube. The inner chamber can comprise an inner space located inside the tube and an outer space located outside the tube.

According to a first variant of the invention, the reactor is arranged:
so that the steam injection zone is located in a lower region of the inner space of the tube, the lower region comprising a first end of the tube,
so that the circulator is located, at least in part, in an upper region of the inner space of the tube, the upper region comprising a second end of the tube opposite the first end, and
so that the sludge introduction zone is located between the lower region and the upper region of the inner space of the tube.

According to a second variant of the invention, the reactor is arranged:
so that the sludge introduction zone is located in a lower region of the inner space of the tube, the lower region comprising a first end of the tube,
so that the circulator is located, at least in part, in an upper region of the inner space of the tube, the upper region comprising a first end of the tube, and
so that the steam injection zone is located between the lower region and the upper region of the inner space of the tube.

In another embodiment, compatible with multiple combinations of the features described above, the vessel comprises an inner jacket arranged to delimit, at least in part, the circulation path so as to form:
an ascending channel in an annular passage between an internal face of the inner chamber and jacketing,
a descending channel in a cylindrical conduit formed by the jacketing,
an upper transverse section arranged to allow sludge to circulate from the ascending channel to the descending channel,
a lower transverse section arranged to allow sludge to circulate from the descending channel to the ascending channel.

Alternatively, the inner jacketing can be arranged to delimit, at least in part, the circulation path so as to constitute:
a descending channel in an annular passage between an internal face of the inner chamber and the jacketing,
an ascending channel in a cylindrical conduit formed by the jacketing,
an upper transverse section arranged to allow sludge to circulate from the ascending channel to the descending channel,
a lower transverse section arranged to allow sludge to circulate from the descending channel to the ascending channel.

According to yet another embodiment, the circulation path is defined, at least in part, by:
a first tube defining an ascending path,
a second tube defining a descending path,
a first transverse conduit arranged so that the first and the second tubes emerge, at their upper portions, into this first transverse conduit, the reactor comprising, in an upper portion of the first transverse conduit, a degassing volume arranged to collect effluent gaseous contained in the sludge, and
a second transverse conduit arranged so that the first and the second tubes emerge, at their lower portions, into this second transverse conduit.

When the reactor comprises a circulator, the circulator can be arranged to generate the circulation of the sludge in the second transverse conduit.

The reactor can further comprise a hydrocyclone arranged to selectively remove (heavy) particles contained in the sludge circulating in the vessel.

DESCRIPTION OF FIGURES AND EMBODIMENTS

Figure 2:
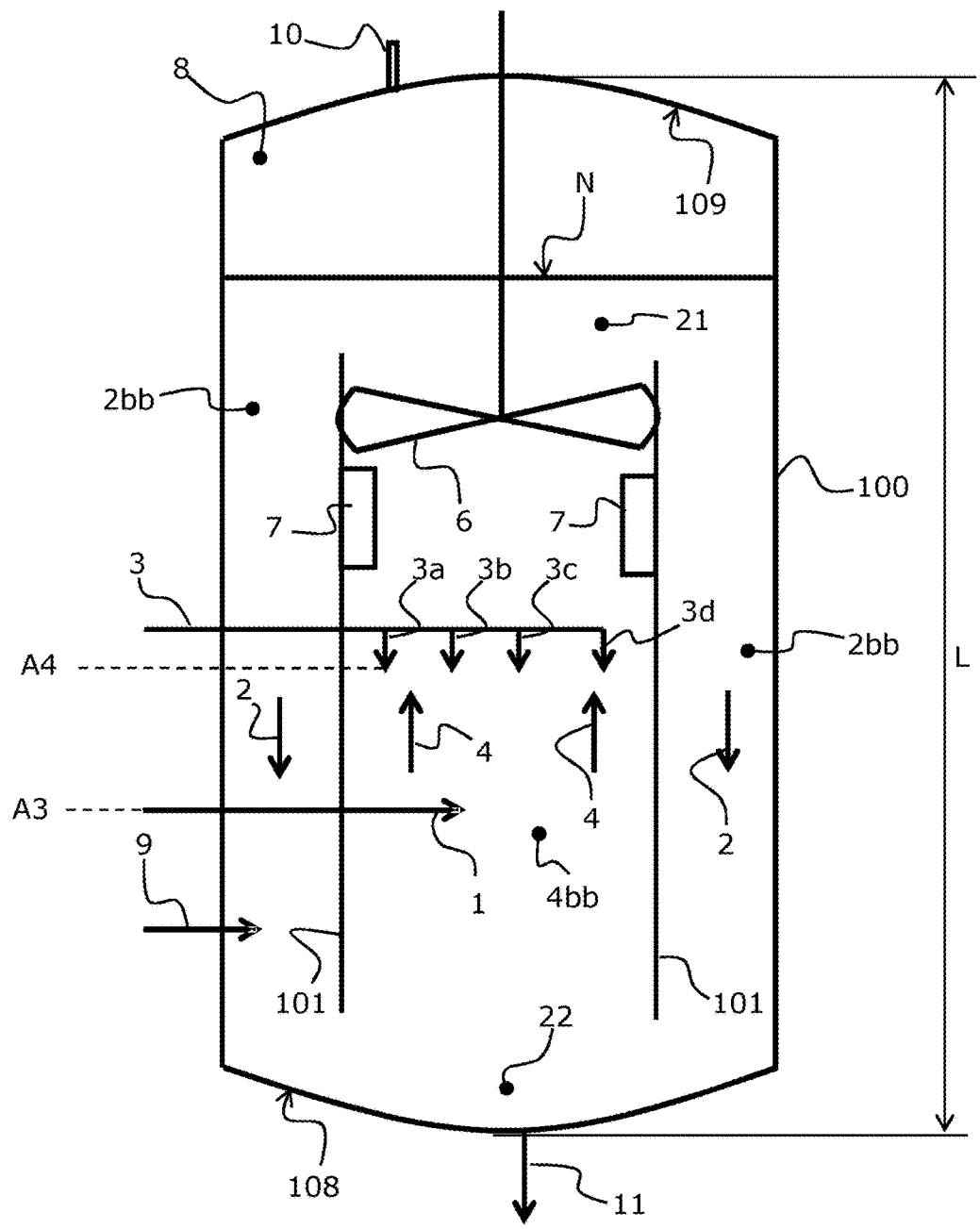
Figure 3:
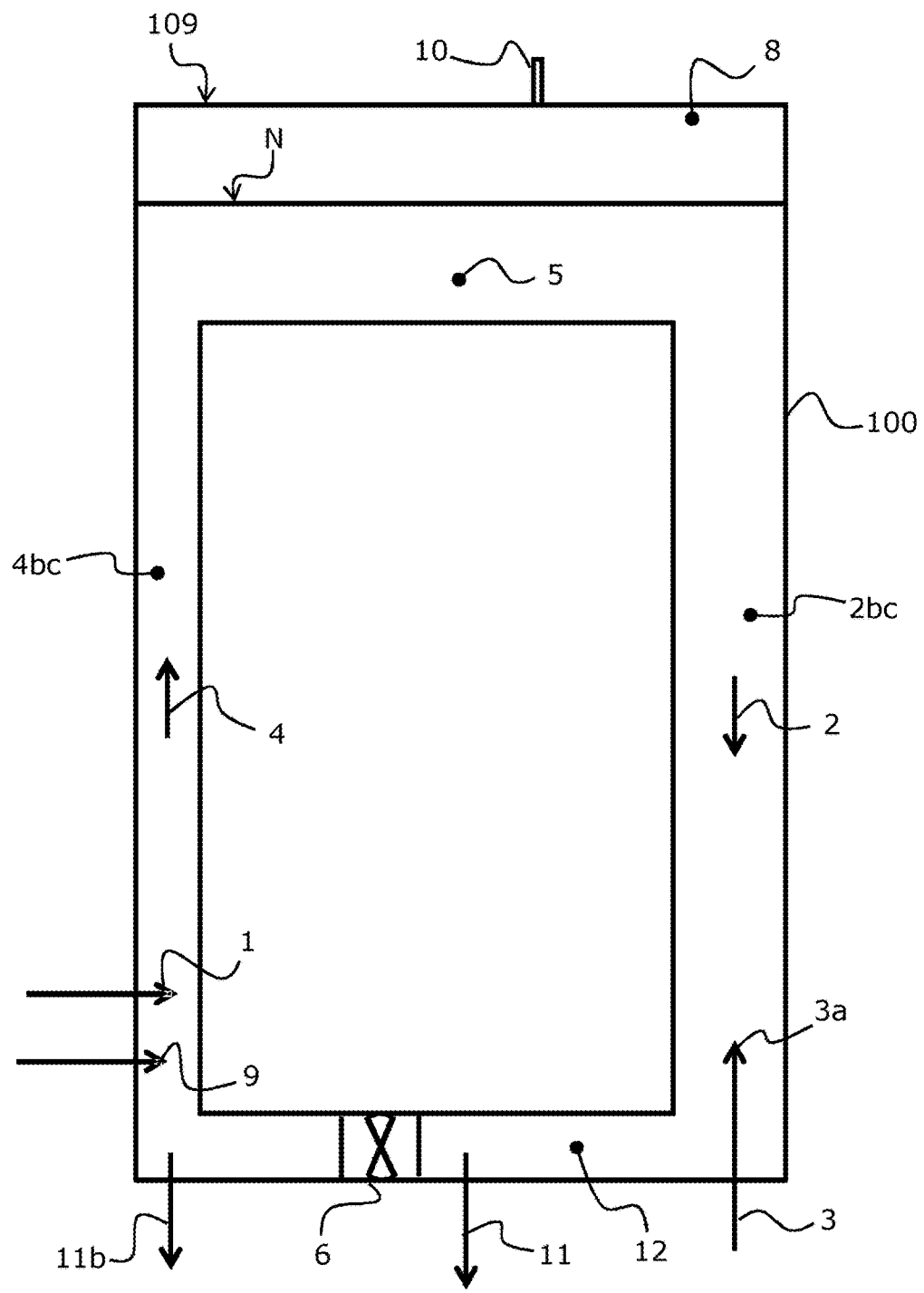

Other advantages and features of the invention will emerge on reading the detailed description of implementations and embodiments which follow, given only by way of non-limiting example and with reference to the accompanying drawings:

FIG. 1 represents a schematic sectional view of a reactor according to a first embodiment of the invention, FIG. 2 represents a schematic sectional view of a reactor according to a second embodiment of the invention, FIG. 3 represents a schematic sectional view of a reactor according to a third embodiment of the invention, FIG. 4 represents a schematic sectional view of a hydrocyclone compatible with the reactor of FIG. 3.

As the embodiments described below are in no way limiting, variants of the invention can notably be considered comprising only a selection of the described features, isolated from the other features described (even if this selection is isolated within a sentence comprising these other features), if this selection of features is sufficient to attribute a technical advantage or to differentiate the invention in relation to the state of the art. This selection comprises at least one feature, preferably functional without structural details, or with only a part of the structural details if only this part is sufficient to attribute a technical advantage or to differentiate the invention in relation to the state of the art.

In this description of embodiments and variants, the steam is water vapor by default.

In this description, the expression "circulation" of sludge, a mixture or a liquid in the reactor refers to any movement of this sludge, this mixture or this liquid in the reactor.

In this description, the expression "circulation path" refers to the path along which this movement takes place in the reactor.

The reactor according to the invention is typically adapted to treat sludge containing organic matter by hydrothermal carbonization.

FIG. 1 represents a sectional view of a reactor according to a first embodiment of the invention, having:

A vessel 100 comprising an inner chamber arranged to receive the sludge and to form a circulation path for the sludge adapted to allow sludge to circulate, the average circulation direction of the sludge is shown by the arrows 2 and 4 in FIG. 1, namely defining a descending direction 2 and an ascending direction 4, in this case, a sludge inlet 1 arranged to introduce the sludge into a sludge introduction area of the inner chamber, a sludge outlet 11 arranged to discharge at least part of the sludge contained in the inner chamber, and a steam inlet 3 arranged to inject steam into a steam injection zone of the inner chamber along a steam injection direction, the steam injection direction being different from an average sludge circulation direction 2 in the steam injection zone along the circulation path, the steam injection zone being separated from the sludge introduction zone.

It should be noted that the steam inlet 3 is not flush on an internal face of the inner chamber of the vessel 100, but emerges in the core of the inner chamber of the vessel 100, so that the steam inlet 3 is surrounded by the sludge+steam mixture in the inner chamber of the vessel 100.

In this embodiment, the expression "circulation of sludge" typically refers to a relative displacement of the sludge defining an average speed of travel Vd of the sludge within the vessel 100 of typically 0.1 to 3 m/s, an average injection speed Ve of the sludge through the sludge inlet 1 of typically 0.005 to 0.1 m/s, or a Vd/Ve ratio of typically 5 to 100.

In the example of FIG. 1, the vessel 100, shown in cross-section, is a closed vessel (i.e. the interior of which is not constantly open to the atmosphere). The vessel 100 is substantially cylindrical in shape about a vertical direction (up-down or down-up direction in FIG. 1), this cylindrical vessel 100 being closed by a lower surface 108 and an upper surface 109 of a substantial hemispheric shape (concave surfaces).

The inner chamber is of vertical dimension L, the vertical being defined by Earth's gravity. In the reactor of FIG. 1, Earth's gravity is exerted along said vertical direction.

Here, the vertical dimension L corresponds to the height of the inner chamber of the vessel 100 measured along said vertical direction, and connecting a horizontal plane passing through the lowest point of the lower surface 108 (concave as seen from the inside of the vessel) to a horizontal plane passing through the highest point of the upper surface 109 (concave as seen from the inside of the vessel).

As illustrated in FIG. 1, the steam injection zone is separate from the sludge introduction zone. Preferably, these zones are separated by a distance greater than L/12, preferably greater than L/8, more preferably greater than L/4, this distance being considered as the shortest distance between two points of the sludge inlet 1 and of the steam inlet 3, respectively.

Furthermore, the steam injection direction is against the sludge circulation direction (preferably opposite) in the steam injection zone.

In this description, the expression "against the circulation direction" means that for an average sludge circulation direction in the steam injection zone in a main direction (vertically downwards in the case of FIG. 1), the steam injection direction has at least one component (vertically upwards) opposite the main direction. In other words, for an average sludge circulation direction in the steam injection zone in a main direction, the steam injection direction forms an angle with the main direction between pi/2 and 3*pi/2 radians. Preferably, this angle is pi radians (opposite vectors).

It can be seen in FIG. 1 that the steam inlet 3 injects steam via a branch connection provided in the bottom of the vessel so that the steam inlet 3 emerges into the inner chamber in an area 2b wherein the sludge moves in the descending direction 2 and so that this steam injection takes place substantially upwards (represented by arrows 3a, 3b, 3c and 3d). The steam is thus injected against the sludge circulation direction (represented by the arrows 2 in this zone 2b). The steam can be injected through a central nozzle, or through several nozzles 3a, 3b, 3c, 3d. The nozzle(s) 3a, 3b, 3c, 3d can be associated with one or more deflectors or diffusers (not represented) to increase turbulence.

In the embodiment of FIG. 1, the steam inlet 3 and the sludge inlet 1 are arranged so that the steam is injected at an altitude A1 lower than the altitude A2 at which the sludge is introduced.

Intensive mixing takes place between the steam, which tends to rise up towards the top of the vessel 100 and the sludge with weak rheological properties, close to water, which tends to descend toward the bottom of the vessel 100. This mixing breaks up any lumps of sludge that are not yet liquefied. Furthermore, this mixing intensifies the condensation of the steam which rapidly provides its heat to the ambient environment.

The vessel 100 of the reactor of FIG. 1 comprises inner jacketing 101 arranged to delimit the circulation path so as to constitute:

an ascending channel 4b in an annular passage between an internal face of the inner chamber and jacketing 101, a descending channel 2b in a cylindrical conduit formed by the jacketing 101, an upper transverse section 21 arranged to allow sludge to circulate from the ascending channel 4b to the descending channel 2b, a lower transverse section 22 arranged to allow sludge to circulate from the descending channel 2b to the ascending channel 4b.

In the example described, sludge is introduced via a branch connection 1 emerging into the descending channel 2b. For this purpose, a sludge inlet conduit passes through the wall of the vessel 100 and the inner jacketing 101 to emerge in the descending channel 2b.

The reactor of FIG. 1 further comprises a circulator 6, e.g. with blades, arranged to circulate the sludge (mixed with steam) inside the inner chamber along the circulation path, i.e. to create or maintain the circulation (i.e. the movement) of the sludge (mixed with steam) directly inside the reactor, independently of the amplitude and direction and speed at which the sludge is introduced into the vessel 100 of the reactor through the sludge inlet 1.

According to variants not represented, the circulator 6 can include:

an agitator with one or more blades, and/or a screw, and/or a pump, and/or a sludge recirculation loop, and/or a bubbler.

The circulator 6 is preferably arranged in an upper portion of the descending channel 2b, below the upper transverse section 21 and above the sludge introduction zone.

In other words, the vessel 100 of FIG. 1 comprises a wall 101 (corresponding to the inner jacketing 101 previously described) arranged to separate two parts of circulation path having opposing sludge circulation directions 2, 4. The sludge flows in an upward direction 4 in the ascending channel 4b, and flow in a downward direction 2 in the descending channel 2b.

In this example, the wall 101 forms a tube, the inner chamber of the vessel 100 comprising an inner space (descending channel 2b) inside the tube 101 and an outer space (ascending channel 4b) outside the tube. The tube 101 corresponds to the inner jacketing 101 previously described.

In this first embodiment, the reactor is arranged:
so that the steam injection zone is located in a lower region of the inner space 2b of the tube 101, the lower region comprising a first end of the tube (toward the bottom in FIG. 1),
so that the circulator 6 is located, at least in part, in an upper region of the inner space 2b of the tube 101, the upper region comprising a second end of the tube (toward the top of the figure) opposite the first end, and
so that the sludge introduction zone is located between the lower region and the upper region of the inner space 2b of the tube 101.

The circulation path thus comprises at least a closed loop which, in the example of FIG. 1, passes through the interior 2b and the exterior 4b of the tube 101. Each closed loop further comprises a junction towards the sludge outlet 11.

Ideally, if the flow lines of sludge circulating in the reactor are considered, these flow lines form at least a closed loop with a bifurcation possible toward the sludge outlet 11.

The reactor comprises, in an upper portion of the inner chamber, above the upper transverse section 21, a degassing volume 8 arranged to collect gaseous effluents contained in the sludge, the reactor further comprising at least one vent 10 arranged to discharge these gaseous effluents.

This degassing volume 8 is defined, in FIG. 1, by a level N which is reached by the sludge contained in the vessel 100, by said upper surface 109 of the vessel 100 and by a portion of the internal face of the inner chamber of the vessel 100, this internal face being substantially cylindrical in shape.

The delimitation of the degassing volume 8 and the sludge contained in the vessel 100 by the level N results from the fact that the reactor is pressurized and that the gaseous effluents collected in degassing volume 8 push the sludge downward.

The sludge contained in the vessel 100 of the reactor typically circulates continuously to perform multiple cycles (or passages along the same circulation path) before discharge through the sludge outlet 11.

To illustrate an implementation of the reactor, an incoming flow of sludge is introduced into the descending channel 2b, between the blades of the circulator 6 and the steam injection 3 nozzles 3a, 3b, 3c, 3d. Between these two sludge introduction and steam injection zones, the mixture, consisting of the sludge and the steam, is subjected to strong turbulence as the steam and the sludge are circulating against one another. This turbulence increases the interactions between steam and sludge, which allows the mixture to homogenize. The sludge can contain fibers, which are highly disaggregated in this zone with the steam, before reaching the circulator 6 while following the circulation path via the descending channel 2b, the lower transverse section 22, the ascending channel 4b, then the upper transverse section 21. This thereby reduces problems caused by fibers being wound around the blades of circulator 6.

Furthermore, with such implementation, mineral parts and aggregates contained in the sludge tend to settle in the bottom of the inner chamber of the vessel 100 by gravity (on an internal face of the lower surface 108), which reduces the interactions of these mineral parts and aggregates with blades of the circulator 6.

The size of the inner jacketing 101 is designed in such a way that the average circulation speed of the sludge in the ascending channel 4b is of the same order of magnitude as in the descending channel 2b. The ratios of the sludge circulation speeds between the ascending channel 4b and the descending channel 2b are in the order of 0.5 to 5. Typically the speeds in the ascending channel 2b are 0.1-3 m/s, typically 0.5-1.5 m/s.

In a mode of implementation, cold sludge is injected into the descending channel 2b with a low injection speed relative to the circulation speed, typically in the order of 0.005 to 0.1 m/s. Due to the shear phenomenon of the sludge by the steam, the cold sludge introduced is rapidly driven into circulation; it is uniformly mixed and its temperature thus increases relatively rapidly.

Owing to the circulator 6, the sludge, uniformly mixed through its interactions with the injected steam, is conveyed into the ascending channel 4b where it continues to be uniformly mixed.

The sludge-steam mixture then arrives in the upper transverse section 21 then calms down in terms of turbulence. Non-condensable gas bubbles separate from the sludge in this upper transverse section 21, and then rise in the degassing volume 8 without returning downward. The gas thus produced by the separation of the bubbles is regularly removed through the vent 10, typically through a valve (not represented) controlled by a pressure regulator (not represented).

The sludge then returns to the descending channel 2b through the circulator 6. At this stage, the sludge is liquefied; the majority of the lumps being reduced so that they no longer interfere with the operation of the circulator 6. Carbonization reactions can then take place for several sludge circulation cycles between the descending 2b and ascending 4b channels successively (i.e. in the closed loop).

An anti-vortex system, such as blades 7, can be installed above the circulator 6 to prevent preferential flow paths and vortex type swirling from forming in the descending channel 2b of the reactor.

The reactor of FIG. 1 comprises an orifice 9 arranged to inject the acid into the vessel 100. The acid is preferably injected into the descending channel 2b, downstream (relative to the circulation of sludge) from the sludge introduction zone and upstream from the steam injection zone. This acid injection can also take place in the ascending channel 4b or either in the upper 21 or lower 22 transverse sections (not represented).

The discharge of carbonized sludge, i.e. its extraction from the inner chamber of the vessel 100 via the sludge outlet 11, preferably takes place in the lower part of the reactor, in the lower transverse section 22, for example at the bottom of the vessel 100 via a branch connection passing through the lower surface 108. This configuration allows non-carbonizable materials such as sand to be drained and eliminated. These solids are preferentially extracted from the reactor while the liquid organic content of the sludge continues to flow along the circulation path.

It should be noted that in case of failure of the circulator 6, the injection of steam via the steam inlet 3 allows the sludge to be mixed in the descending channel 2*b* and natural circulation to take place.

FIG. 2 represents a second embodiment of the invention wherein the reactor comprises the same mechanical devices or components as the reactor of the first embodiment. Only the arrangement of these mechanical devices or components differs. FIG. 2 is described essentially according to its differences with FIG. 1.

In this second embodiment, the sludge is introduced at the bottom of the ascending channel 4*bb*.

The descending channel 2*bb* is no longer located in the inner space 4*bb* of the tube 101 as in the solution shown in FIG. 1, but in the space 2*bb* outside the tube 101.

The ascending channel 4*bb* is thus located inside the jacketing 101. Both of these descending 2*bb* and ascending 4*bb* channels are connected, as in the solution described in FIG. 1, by upper 21 and lower 22 transverse sections.

Steam is injected via a branch connection emerging in the ascending channel 4*bb* in the inner space of the jacketing 101.

Sludge is introduced into the ascending channel 4*bb*, in the inner space of the tube 101.

In this second embodiment of FIG. 2, the steam inlet 3 and the sludge inlet 1 are arranged so that the sludge is introduced at an altitude A3 lower than altitude A4 at which the steam is injected.

The reactor also comprises an anti-vortex system 7, this time installed below the circulator 6, i.e. upstream from the circulator 6 relative to the circulation direction 4 of the sludge, similarly to the embodiment of the FIG. 1.

All other configurations, for example the arrangement of the sludge inlet 1 and/or the steam inlet 3 to introduce sludge and/or to inject steam into the ascending channel 4*b* (embodiment of FIG. 1) or the descending channel 2*bb* (embodiment of FIG. 2), is possible but does not confer any substantial benefits in relation to the embodiments described here.

FIGS. 3 and 4 present a third embodiment wherein the circulation path is defined by:
 a first tube defining an ascending path 4*bc*,
 a second tube defining a descending path 2*bc*,
 a first transverse conduit 5 arranged so that the first and the second tubes emerge, at their upper portions, in this first transverse conduit 5, the reactor comprising, in an upper portion of the first transverse conduit 5, a degassing volume 8 arranged to collect gaseous effluent contained in the sludge, and
 a second transverse conduit 12 arranged so that the first and the second tubes emerge, at their lower portions, in this second transverse conduit 12.

Similarly to the embodiments of FIGS. 1 and 2, the degassing volume 8 is defined, in FIG. 3, by the level N reached by the sludge contained in the vessel 100, by the upper surface 109 of the vessel 100 and by a portion of the internal face of the inner chamber of the vessel 100.

Furthermore, the circulator 6, e.g. a centrifugal pump, is arranged in this example, to generate the circulation of sludge in the second transverse conduit 12.

In this third embodiment, the steam inlet 3 is arranged to inject the steam in the lower part of the descending path 2*bc*, against the direction of sludge flow in the reactor.

The sludge inlet 1 is arranged to introduce the cold sludge via a branch connection in the lower part of the ascending path 4*bc* to allow sludge to travel a maximum period of time before arriving at the circulator 6 and extraction from the reactor through the sludge outlet 11.

The first transverse conduit 5, in which the sludge flows at lower speed, allows incondensables to be degassing toward the degassing volume 8, then toward a discharge connection 10.

In this third embodiment, acid can be injected, by a branch connection 9, into the ascending path 4*bc* (as illustrated in FIG. 3) or into the descending path 2*bc* (not represented).

A discharge connection 11 is located in the second transverse conduit 12 to form the sludge outlet, preferably upstream from the circulator 6 (relative to the circulation of sludge), so that the discharge of the mineral particles contained in the sludge is given priority, by gravity or by means of a hydrocyclone 400 as shown in FIG. 4.

A back-up branch connection 11*b* is fitted on the lower part of the ascending path 4*bc* to evacuate any accumulation of heavy particles at this location. This back-up branch connection 11*b* is opened periodically in order to discharge the accumulated particulates.

Sludge can be alternatively introduced into the descending path 2*bc* (not represented). In this case, the circulator 6 is preferentially located in the ascending path 4*bc* (not represented).

Any other configuration of the respective positions of the circulator 6 and the sludge inlet 1 is possible but does not confer any substantial benefits in relation to the embodiments described here.

It should be noted that if the circulator 6 consists of a centrifugal type pump that can accept solids, sludge can also be injected directly upstream from the circulator 6 in order to be ground therein for better homogenization (not represented). However, this method would necessarily involve a pretreatment of the sludge prior to its introduction into the reactor to ensure that no fibers wrap around the circulator 6.

FIG. 4 illustrates a hydrocyclone 400 which can be mounted on the reactor of FIG. 3 in the second transverse conduit 12, at the discharge connection 11.

Such a hydrocyclone 400 is arranged to selectively eliminate heavy particles (heavy sands) contained in the sludge. The centrifugation principle, known to those skilled in the art, allows heavy sands to be eliminated while allowing the light liquefied material to continue its path while circulating in the reactor.

The presence of a hydrocyclone 400, as illustrated in FIG. 4, in a reactor, as illustrated in FIG. 3, allows a minimum of abrasive materials to circulate in the inner chamber of the vessel 100 and in the circulator 6.

Of course, the invention is not limited to the examples described here and numerous modifications can be made to these examples within departing from the scope of the invention. For example, the hydrocyclone of FIG. 4 could be incorporated into the embodiment of FIG. 1 or FIG. 2. Furthermore, the various characteristics, forms, variants and embodiments of the invention may be associated with each other in various combinations insofar as they are not incompatible or mutually exclusive of the others.

The invention claimed is:

1. A reactor for treating sludge containing organic matter, particularly by hydrothermal carbonization, including:
 a vessel (100) comprising an inner chamber arranged to receive the sludge and to form a circulation path for the sludge adapted to allow the sludge to circulate,
 a sludge inlet (1) arranged to introduce the sludge into a sludge introduction area of the inner chamber,
 a sludge outlet (11) arranged to discharge at least part of the sludge contained in the inner chamber, and a steam inlet (3) arranged to inject steam in a steam injection zone of the inner chamber along a steam injection direction, the steam injection direction being different from a sludge circulation direction in the steam injection zone along the circulation path, the steam injection zone being separated from the sludge introduction zone, wherein the circulation path comprises at least a closed loop; and said reactor further comprising, in an upper portion of the inner chamber, a degassing volume (8) arranged to collect gaseous effluents contained in the sludge, the reactor further comprising at least one vent (10) arranged to discharge these gaseous effluents.

2. The reactor according to claim 1, wherein the inner chamber is of vertical dimension L, and wherein the steam injection zone is separated from the sludge introduction zone by a distance greater than L/12.

3. The reactor of claim 2, wherein the steam injection zone is separated from the sludge introduction zone by a distance greater than L/8.

4. The reactor of claim 2, wherein the steam injection zone is separated from the sludge introduction zone by a distance greater than L/4.

5. The reactor according to claim 2, wherein the steam injection direction is against the sludge circulation direction (2) in the steam injection zone.

6. The reactor according to claim 2, further comprising a circulator (6) arranged to circulate the sludge in the inner chamber along the circulation path.

7. The reactor according to claim 1, wherein the steam injection direction is against the sludge circulation direction (2) in the steam injection zone.

8. The reactor according to claim 7, further comprising a circulator (6) arranged to circulate the sludge in the inner chamber along the circulation path.

9. The reactor according to claim 1, further comprising a circulator (6) arranged to circulate the sludge in the inner chamber along the circulation path.

10. The reactor according to claim 9, wherein the inner chamber comprises an inner space (2b) located inside the tube (101) and an outer space (4b) located outside the tube (101), the reactor being arranged:
so that the steam injection zone is located in a lower region of the inner space (2b) of the tube (101), the lower region comprising a first end of the tube (101),
so that the circulator (6) is located, at least in part, in an upper region of the inner space (2b) of the tube (101), the upper region comprising a second end of the tube (101) opposite the first end, and
so that the sludge introduction zone is located between the lower region and the upper region of the inner space (2b) of the tube (101).

11. The reactor according to claim 1, further comprising at least one orifice (9) arranged to inject the acid to the vessel (100).

12. The reactor according to claim 1, wherein the vessel (100) comprises a wall (101) arranged to separate two parts of the circulation path having opposing sludge circulation directions (2, 4).

13. The reactor according to claim 12, wherein the wall (101) forms a tube.

14. The reactor according to claim 1, further comprising a hydrocyclone (400) arranged to selectively eliminate heavy particles contained in the sludge circulating in the vessel (100).

15. A reactor for treating sludge containing organic matter, particularly by hydrothermal carbonization, including:
a vessel (100) comprising an inner chamber arranged to receive the sludge and to form a circulation path for the sludge adapted to allow the sludge to circulate,
a sludge inlet (1) arranged to introduce the sludge into a sludge introduction area of the inner chamber,
a sludge outlet (11) arranged to discharge at least part of the sludge contained in the inner chamber, and
a steam inlet (3) arranged to inject steam in a steam injection zone of the inner chamber along a steam injection direction, the steam injection direction being different from a sludge circulation direction in the steam injection zone along the circulation path, the steam injection zone being separated from the sludge introduction zone,
wherein the circulation path comprises at least a closed loop, and
wherein the vessel (100) comprises an inner jacketing (101) arranged to delimit the circulation path so as to constitute:
an ascending channel (4b) in an annular passage between an internal face of the inner chamber and jacketing (101),
a descending channel (2b) in a cylindrical conduit formed by the jacketing (101),
an upper transverse section (21) arranged to allow sludge to circulate from the ascending channel (4b) to the descending channel (2b),
a lower transverse section (22) arranged to allow sludge to circulate from the descending channel (2b) to the ascending channel (4b).

16. The reactor according to claim 15, further comprising, in an upper portion of the inner chamber, a degassing volume (8) arranged to collect gaseous effluents contained in the sludge, the reactor further comprising at least one vent (10) arranged to discharge these gaseous effluents.

17. A reactor for treating sludge containing organic matter, particularly by hydrothermal carbonization, including:
a vessel (100) comprising an inner chamber arranged to receive the sludge and to form a circulation path for the sludge adapted to allow the sludge to circulate,
a sludge inlet (1) arranged to introduce the sludge into a sludge introduction area of the inner chamber,
a sludge outlet (11) arranged to discharge at least part of the sludge contained in the inner chamber, and
a steam inlet (3) arranged to inject steam in a steam injection zone of the inner chamber along a steam injection direction, the steam injection direction being different from a sludge circulation direction in the steam injection zone along the circulation path, the steam injection zone being separated from the sludge introduction zone,
wherein the circulation path comprises at least a closed loop,
said reactor further comprising a circulator (6) arranged to circulate the sludge in the inner chamber along the circulation path, and
wherein the circulation path is defined by:
a first tube defining an ascending path (4bc),
a second tube defining a descending path (2bc),
a first transverse conduit (5) arranged so that the first and the second tubes emerge, at their upper portions, in this first transverse conduit (5), the reactor comprising, in an upper portion of the first transverse conduit (5), a degassing volume (8) arranged to collect effluent gaseous contained in the sludge, and a second transverse conduit (12) arranged so that the first and the second tubes emerge, at their lower portions, in this second transverse conduit (12).

18. The reactor according to claim 17, wherein the circulator (6) is arranged to generate the circulation of sludge in the second transverse conduit (12).

19. The reactor according to claim 17, further comprising, in an upper portion of the inner chamber, a degassing volume (8) arranged to collect gaseous effluents contained in the sludge, the reactor further comprising at least one vent (10) arranged to discharge these gaseous effluents.

\* \* \* \* \*